UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PLASTIC COMPOSITION AND PROCESS OF MAKING THE SAME.

1,274,728. Specification of Letters Patent. Patented Aug. 6, 1918.

No Drawing. Application filed July 3, 1914. Serial No. 848,801.

*To all whom it may concern:*

Be it known that I, JAMES P. A. McCOY, a citizen of the United States, and a resident of Wilkinsburg, in the county of Allegheny and State of Pennsylvania, have invented a new and useful Improvement in Plastic Compositions and Processes of Making the Same, of which the following is a specification.

My invention relates to plastic compositions and processes of making them, and it has special reference to such compositions as are adapted to the manufacture of electric insulation.

The object of my invention is to prepare efficient and inexpensive compositions which can be molded into articles of high dielectric strength and which are characterized by the presence of tannins and tannin-containing substances.

I have discovered that tannins and tannates are highly efficient binding materials for making molded articles, and that such articles, when molded, are well suited to the manufacture of electric insulation. Some of the tannins form compositions that can be molded cold, while others form compositions which require heat in the molding process.

For cold molding, I prefer to employ the tannins which are soluble in water, together with fillers which combine with the tannins, presumably with the formation of tannates. Such basic fillers are calcium oxid and magnesium oxid but it is to be understood that any basic substance capable of combining with the tannins to form water-insoluble compounds are suitable for my use. In this modification of my process, any of the water-soluble tannins may be used, such, for example, as those derived by the extraction of oak wood. In addition to the basic fillers just described, any of the ordinary inert fillers may also be added to the mass before molding.

In hot molding, my invention may be practised according to a number of modifications. One of the simplest of these comprises grinding oak bark, or other barks of trees which contain large amounts of water-insoluble tannins, and molding the resulting powder under heat and pressure, either with or without the addition of inert fillers, such as wood flour, ground asbestos, magnesium carbonate, etc. I have found that this simple operation produces hard and firmly molded articles, the tannin present in the bark acting as an efficient binder. Other natural cellular materials containing tannins may also be treated according to this modification of my process, and it may sometimes be advantageous to extract the tannins from such materials and return the liquid extract to the mass before molding. By this procedure, the tannins are removed from the cells of the material and segregated, in which form they act as binders more readily than when they are are confined within the cells of the material. By this procedure, it is possible to make compact and hard molded articles of ground cork, which ordinarily cannot be molded, even under great pressure and heat.

According to another modification of my process, I coagulate organic colloids, such as gelatin and albumin, by treating them with tannins. The precipitate is insoluble in water and, when combined with inert fillers, forms masses that can be readily molded into efficient electric insulators. The proportions in which the coagulated colloids are mixed with the fillers may be varied within wide limits, as will be readily understood by those skilled in the art. The filler, however, will ordinarily predominate in the mixture.

A still further modification of my process makes possible the use of an insoluble waste product of the ordinary leather-tanning processes. In tanning leather, it is necessary that the tannins be present in soluble form, and it is usual to treat insoluble tannins with sulfite liquor in order to render them soluble. In the further stages of the tanning process, certain of the tannins, notably catechol tannin form insoluble condensation products known as phlobaphenes or reds, and these phlobaphenes settle to the bottom of the tanning pit as a red sediment, which has heretofore been considered useless and has been thrown away. This material, however, is well suited for use in my process and it may be combined with any of the usual inert fillers and subjected to the manipulations common in hot molding, yielding highly efficient electric insulation when so molded.

Tannin-containing material may vary widely in composition and still be adapted for use in the various modifications of my process. The tannins may be either natural or synthetic, and the numerous tannins, or commercially so-called tannic acids, such as oak tannin, red-wood tannin, hemlock tannin and the like, are all equally useful, it being only necessary to distinguish between the water-soluble tannins, which are suitable for cold molding, and the water-insoluble tannins which are suitable for hot molding. Most tannins contain a greater or less proportion of glucosids, but the presence or absence of these bodies is immaterial, so far as the success of my process is concerned. These glucosids appear to form insoluble compounds, or at least to be held in suspension in the molded composition in such a manner that the composition itself is insoluble.

In the appended claims, the expression "tannic material" is to be understood as a generic term, including tannic acids, tannates, and other tannic acid derivatives, such as the coagulated colloids and phlobaphenes referred to above.

It will be apparent to those skilled in the art that the process described above is capable of being applied under a wide variety of circumstances, and it is to be understood that the examples given are merely illustrative and that no limitations are to be imposed upon my invention except such as are indicated in the appended claims.

I claim as my invention:

1. A substantially water-insoluble plastic composition that contains a substantial proportion of tannic material and is capable of being rapidly molded without preliminary shaping.

2. A substantially water-insoluble plastic composition that contains a filler and a substantial proportion of tannic material and is capable of being rapidly molded without preliminary shaping.

3. A plastic composition that contains water-insoluble tannic material and cellular organic material, and is capable of being rapidly molded without preliminary shaping.

4. A plastic composition containing phlobaphenes or reds, which are water-insoluble condensation products of di-hydric phenols.

5. A plastic composition that contains water-insoluble tannic material and cork, and is capable of being rapidly molded without preliminary shaping.

In testimony whereof, I have hereunto subscribed my name this 30th day of June, 1914.

JAMES P. A. McCOY.

Witnesses:
W. H. KEMPTON,
B. B. HINES.